United States Patent
Duelm et al.

(10) Patent No.: US 9,115,591 B2
(45) Date of Patent: Aug. 25, 2015

(54) UNIVERSAL SEAL

(75) Inventors: Bradley T. Duelm, Wethersfield, CT (US); Randall J. Brown, Hartford, CT (US); Nathan A. Shirk, Lebanon, PA (US); Lewis M. Holby, Windsor, CT (US)

(73) Assignee: UNITED TECHNOLOGIES CORPORATION, Hartford, MI (US)

( * ) Notice: Subject to any disclaimer, the term of this patent is extended or adjusted under 35 U.S.C. 154(b) by 921 days.

(21) Appl. No.: 13/221,285

(22) Filed: Aug. 30, 2011

(65) Prior Publication Data

US 2013/0051991 A1 Feb. 28, 2013

(51) Int. Cl.
*F01D 11/00* (2006.01)
*F16J 15/44* (2006.01)

(52) U.S. Cl.
CPC ............. *F01D 11/001* (2013.01); *F16J 15/444* (2013.01); *F05D 2250/283* (2013.01); *Y10T 29/49297* (2015.01)

(58) Field of Classification Search
CPC .. F01D 11/001; F16J 15/444; F05D 2250/283
USPC ......... 415/173.7, 174.3, 174.4; 277/411, 412, 277/414, 415, 416, 419; 29/888.3, 889.21
See application file for complete search history.

(56) References Cited

U.S. PATENT DOCUMENTS

| 3,603,599 | A | 9/1971 | Laird et al. |
| 5,228,195 | A | 7/1993 | Brown et al. |
| 6,916,021 | B2 | 7/2005 | Beeck et al. |
| 7,334,983 | B2 | 2/2008 | Alvanos et al. |
| 2004/0239040 | A1 * | 12/2004 | Burdgick ................ 277/414 |
| 2009/0324395 | A1 * | 12/2009 | Rose et al. ............... 415/173.7 |

\* cited by examiner

*Primary Examiner* — Edward Look
*Assistant Examiner* — Juan G Flores
(74) *Attorney, Agent, or Firm* — Carlson, Gaskey & Olds, P.C.

(57) ABSTRACT

A seal for a gas turbine engine is shown. The engine may have a first vane for imparting a first twist to air passing thereby and/or a second vane for imparting a second, different twist to air passing thereby, each of the first and second vanes having a mounting area for mounting the seal thereto. The seal includes a top, a bottom, a left side, a right side a back, and a front. The back is parallel to the front and the left side is parallel to the right side such that a non-square shape is formed by the intersection of the back, the left side, the front and the right side so that the seal may mate with the mounting area of the first vane and, if the seal is inverted, may mate with the mounting area of the second vane.

13 Claims, 4 Drawing Sheets

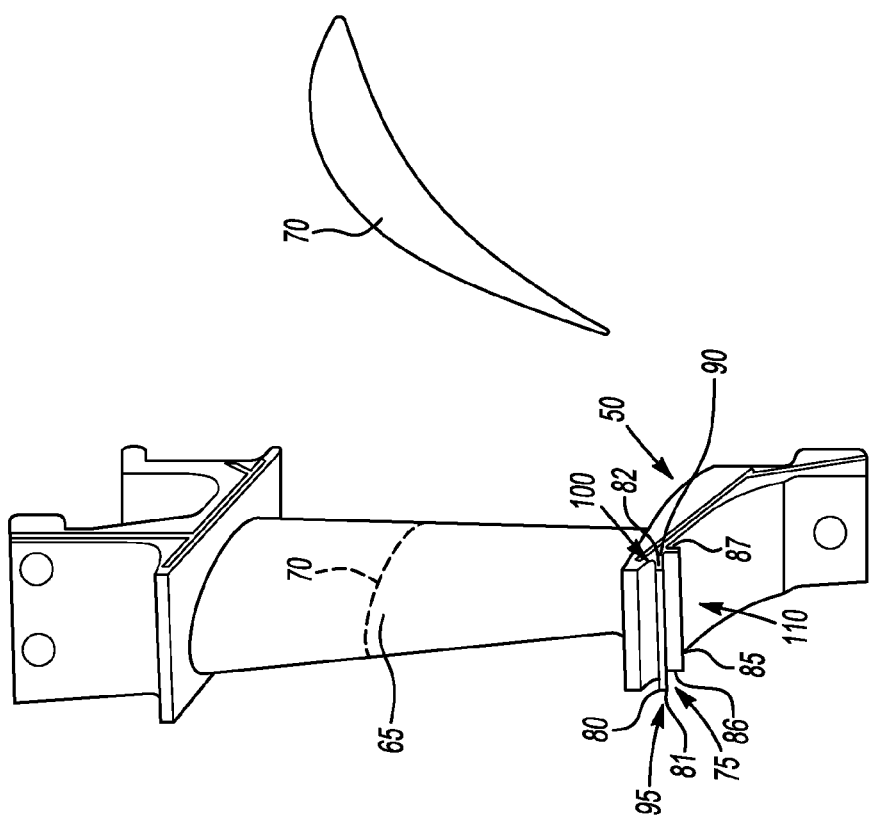
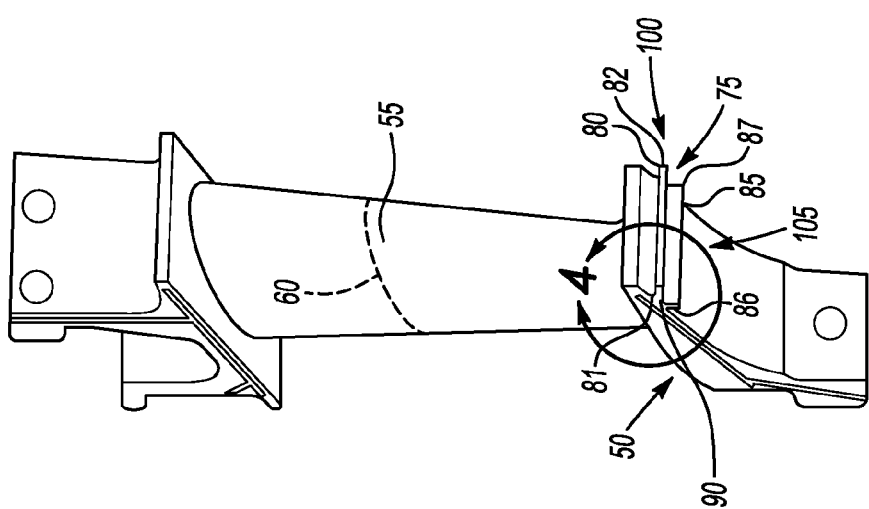
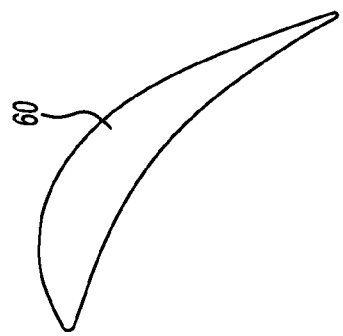
Fig-2A
Fig-2B

UNIVERSAL SEAL

BACKGROUND OF THE INVENTION

In gas turbine engines, the overall operating efficiency may be adversely affected by leakage of a working fluid around the tips or the bases of rotating airfoils. More specifically, in a compressor, leakage of the compressed fluid around the tips or the roots of the airfoils may result in a loss of lift and may introduce viscous losses. This in turn reduces the pressure rise capability of the compressor and causes wasteful conversion of input mechanical energy into gas energy.

It is known to utilize a cellular shroud or honeycomb-type abradable seal construction over the vane tips or about its roots to stabilize the flow near the vane root or compressor casing or wall allowing a higher pressure rise before separation and/or desensitizing the performance of the compressor to inlet radial velocity profile changes near the cellular shroud or honeycomb seal.

SUMMARY OF THE INVENTION

According to a non-limiting example disclosed herein, a seal for a gas turbine engine is shown. The engine may have a first vane for imparting a first twist to air passing thereby and/or a second vane for imparting a second, different twist to air passing thereby, each of the first and second vanes having a mounting area for mounting the seal thereto. The seal includes a top, a bottom, a left side, a right side a back, and a front. The back is parallel to the front and the left side is parallel to the right side such that a non-square shape is formed by the intersection of the back, the left side, the front and the right side so that the seal may mate with the mounting area of the first vane and, if the seal is inverted, may mate with the mounting area of the second vane.

According to further non-limiting example disclosed herein, a gas turbine engine having a seal, includes a first vane for imparting a first twist to air passing thereby and/or a second vane for imparting a second, different twist to air passing thereby, each of the first and second vanes having a mounting area for mounting the seal thereto. The seal has a top, a bottom, a left side, a right side, a back, and a front. The back is parallel to the front and the left side is parallel to the right side such that a non-square shape is formed by the intersection of the back, the left side, the front and the right side so that the seal may mate with the mounting area of the first vane and, if the seal is inverted, may mate with the mounting area of the second vane.

According to a still further non-limiting example disclosed herein, a method for mounting a seal in a gas turbine engine includes providing either a first vane imparting a first twist of air passing thereby or a second vane imparting a second, different twist of air passing thereby. The first vane has a first mounting area and the second vane has a second mounting area. The method further includes: selecting one of the first vane or the second vane; examining the seal and, inverting the seal to fit the first or second mounting area if the seal does not first fit the first or second mounting area after examining the seal.

These and other features of the present invention can be best understood from the following specification and drawings, the following of which is a brief description.

BRIEF DESCRIPTION OF THE DRAWINGS

FIG. 2A is a schematic depiction of an inlet vane providing counterclockwise swirl to air entering in the gas turbine engine of FIG. 1.

FIG. 2B is a schematic depiction of an inlet vane providing clockwise swirl to air entering in the gas turbine engine of FIG. 1.

DETAILED DESCRIPTION OF THE PREFERRED EMBODIMENT

Figure 1:
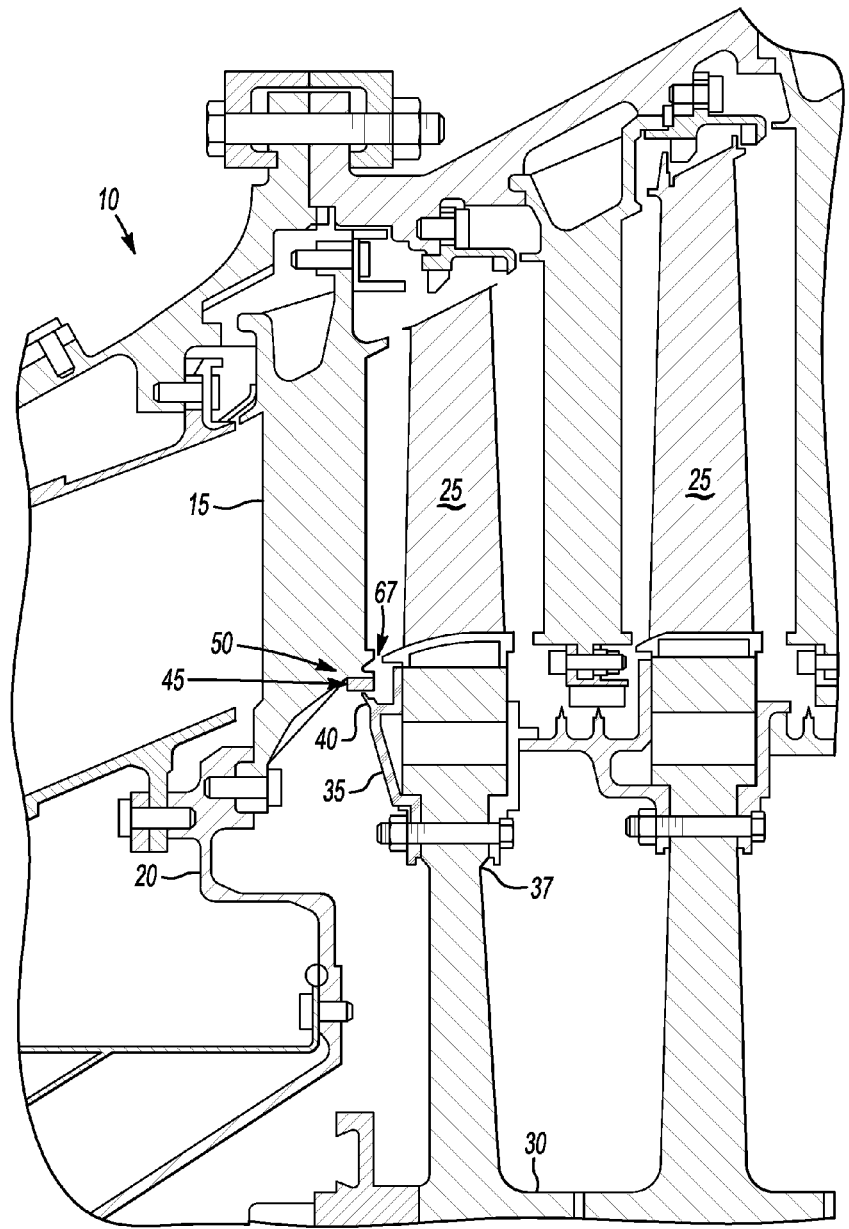
FIG. 1 is a schematic, cutaway depiction of a portion of gas turbine engine.

Referring now to FIG. 1, a cross-section of a portion of a gas turbine engine 10 is shown. Gas turbine engine 10 has an inlet vane 15 fixedly attached to a stationary frame 20. A compressor vane 25, or the like, is attached to a rotating hub 30 by a strut 37. An air seal 35 having a knife edge 40 extending angularly towards the inlet vane 15 is mounted to the strut 37. A seal 45 that interacts with the knife edge 40 attaches to a base 50 of the inlet vane 15. Though the vane 15 is shown as an inlet vane, other airfoils such as blades are contemplated herein. Similarly, though the vane 25 is shown as a compressor vane, other vane types are contemplated herein.

Referring now to FIGS. 2A and 2B, a counterclockwise inlet vane 55 has a first airfoil section 60 that imparts a counterclockwise swirl to air entering the gas turbine engine 10. Similarly, referring to FIG. 2B, a clockwise inlet vane 65 has a second airfoil section 70 which imparts a clockwise swirl to air entering the gas turbine engine 10. In each engine a counterclockwise inlet vane 55 or clockwise inlet vane 65 may be used to impart air swirls to the gas turbine engine 10 as is required by design constraints. The inventors have discovered that creating one seal 45 that fits either a clockwise inlet vane 65 or a counterclockwise inlet vane 55 may minimize costs and time to manufacture an inlet vane 15 that minimizes a loss of air through a gap 67 between the base 50 of the inlet vanes 15 and the vanes 25 (see FIG. 1).

Figure 4:
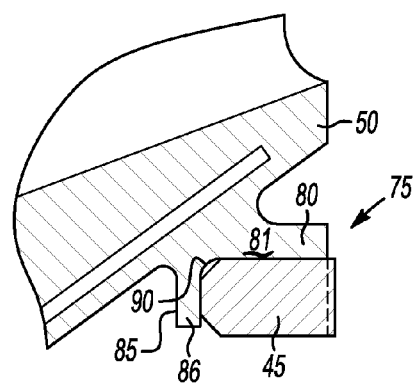
FIG. 4 is a cross-sectional view of a honeycomb seal of FIG. 1.

Referring now to FIGS. 2A, 2B, and 4, the base 50 has an attachment area 75 including: a first flange 80 having a horizontal orientation, a left edge 81 and a right edge 82; a second flange 85 having a vertical orientation, a left edge 86 and a right edge 87; the first flange and the second flange being joined by an impediment such as a radius surface 90. The left edge 86 of the second flange and the left edge 81 of the first edge are in plane forming a left face 95; and the right edge 82 of the first flange 80 and the right edge 87 of the second flange 85 are in plane forming a right face 100. The left face 95 and the right face 100 are parallel to each other, and with the first flange 80 and the second flange 85 form a first parallelogram 105 in the base 50 of the counterclockwise inlet vane 55 and a second parallelogram 110 in the base 50 of the clockwise inlet vane 65 as will be discussed infra.

Figure 3A:
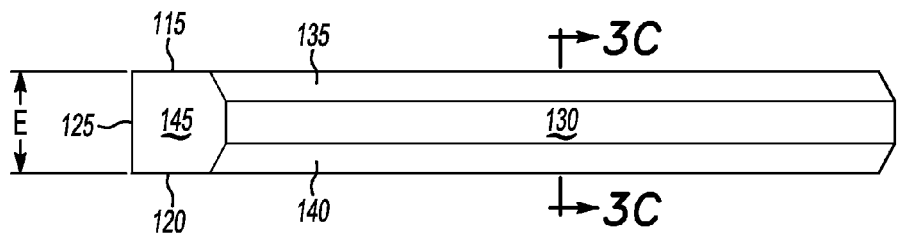
FIG. 3A is a side view of a honeycomb seal of FIG. 1.
Figure 3B:
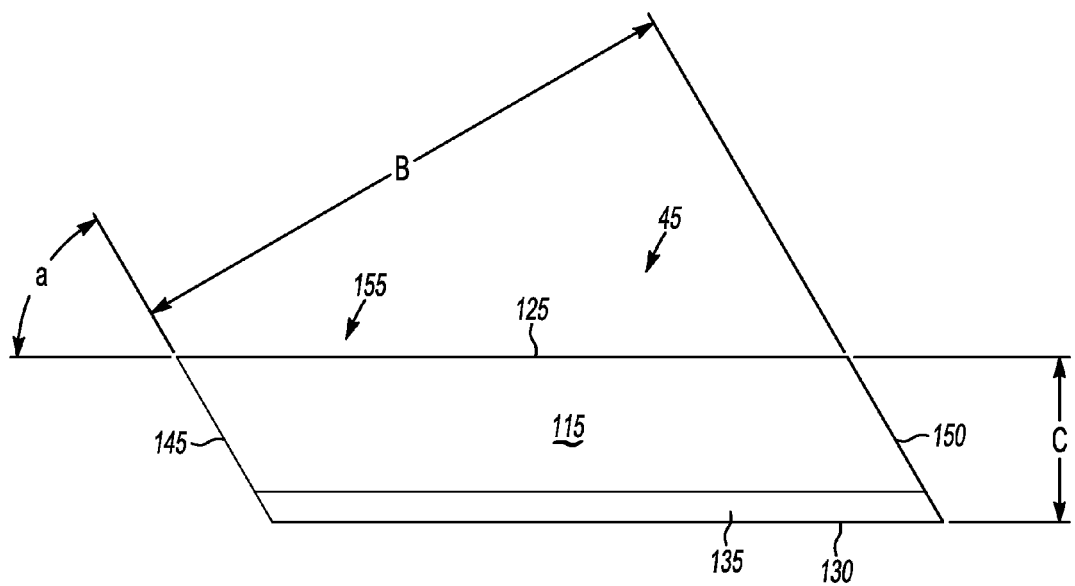
FIG. 3B is a top view of the honeycomb seal of FIG. 3A.
Figure 3C:
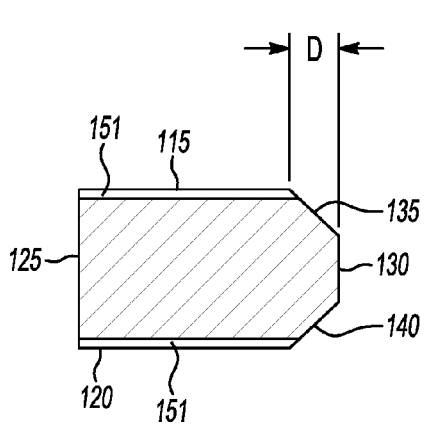
FIG. 3C is a cross-sectional view, taken along the lines of 3C-3C of the honeycomb seal of FIG. 3A.

Referring now to FIGS. 3A through 3C, the seal 45 is shown. The seal has a top 115, a bottom 120, a back 125, a front 130, a first chamfer 135 extending from the top 115 to the front 130 and a second chamfer 140 extending from the front 130 to the bottom 120. The seal has a left face 145 and a right face 150. As oriented in FIG. 3B, the honeycomb seal 45 is intended for use in the counterclockwise inlet vane 55 assuming top 115 attaches to the first flange 80 in FIG. 2A. The left face 145 of the seal 45 is in plane with the left face 95 and the right face 150 of the seal is in plane with the right face 100. The first chamfer 135 and the second chamfer 140 are angled at 45° to avoid contact with the radius surface 90 during and after assembly. The seal has a honeycomb sealing surface 151 on the top 115 and the bottom 120 thereof so that the seal may be used with either the counterclockwise inlet vane 55 or the clockwise inlet vane 65.

Figure 5A:
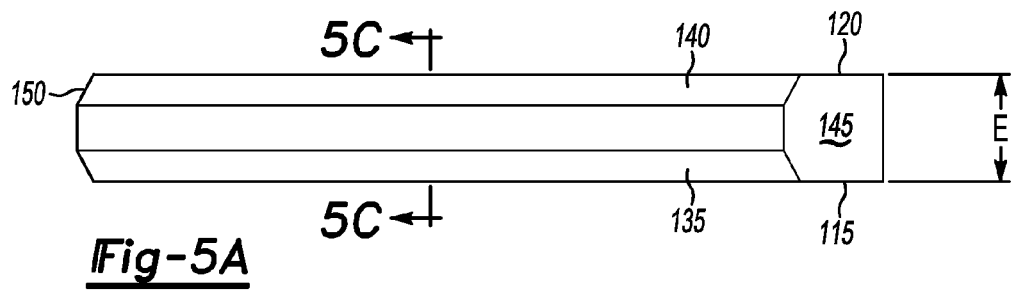
FIG. 5A is a side view of a honeycomb seal of FIG. 1.
Figure 5B:
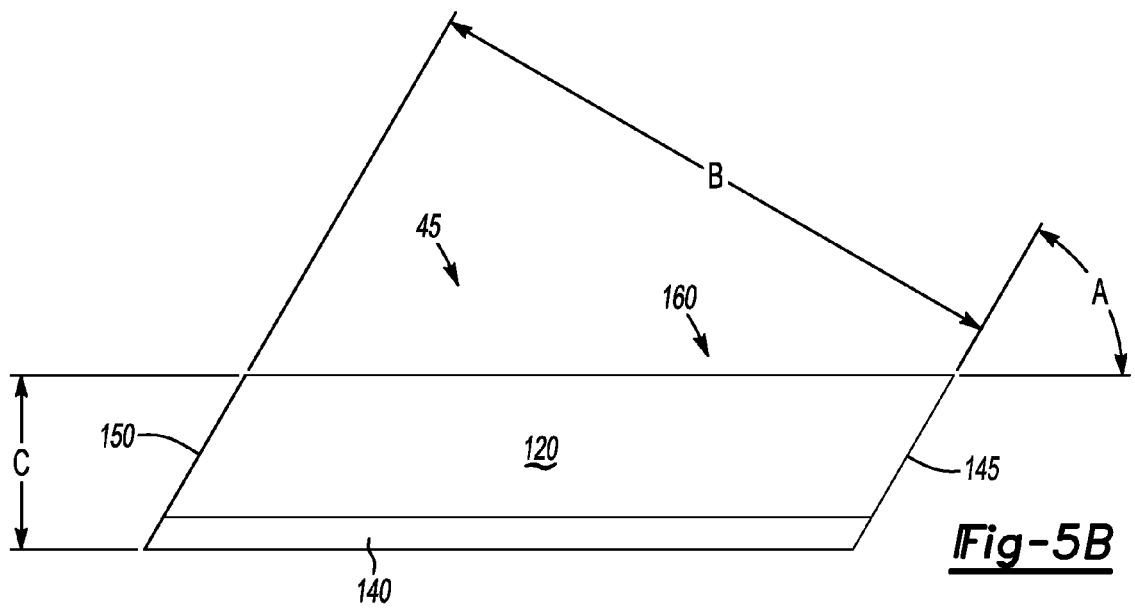
FIG. 5B is a top view of the honeycomb seal of FIG. 5A.
Figure 5C:
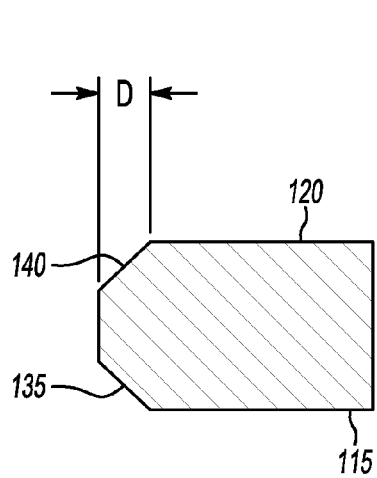
FIG. 5C is a cross-sectional view, taken along the lines of 5C-5C of the honeycomb seal of FIG. 5A.

However, as shown in FIGS. 5A-5C, the seal 45 is shown in orientation for use with the clockwise inlet vane 65 assuming bottom 120 attaches to the first flange 80 in FIG. 2B. Comparing FIGS. 3B and 5B, the orientation of the seal 45 shown in FIG. 5B is inverted from the seal shown in FIG. 3B. That is, the top 115 in 3B is now the bottom 120 in FIG. 5B and the bottom 120 is now the top as shown. Similarly, the left-face 145 is now the right-face, and the right-face 150 is now the left-face. In such a position, the seal 45 may be inserted into the attachment area 75 of the counterclockwise inlet vane 55. For use in the clockwise vane 65, the honeycomb must be inverted and used as shown in FIG. 5B.

As shown in FIG. 3B, a third parallelogram 155 is shown where the back 125 extends to the left over the front 130. Similarly, the seal 45 is shown inverted in FIG. 5 such that a fourth parallelogram is shown where the back of the 125 of the seal 45 extends over the right side of the face-front 130 to form a fourth parallelogram 160. In the inlet vane 55, the seal 45 fits within the attachment area 75 such that the first parallelogram 105 mates with the third parallelogram 155 of the seal 45. And if the inlet vane 65 is used, the second parallelogram 110 mates with the fourth parallelogram 160. All of the first, second, third and fourth parallelograms 105, 110, 155, 160 are not square. The seal 45 is brazed to the first flange 80 and the second flange 85 and the chamfered areas 135 and 145 avoid the radius surface 90 whether in a clockwise inlet vane 65 or a counterclockwise inlet vane 55.

The angle α of the parallelograms between the back face and the front face in both instances is 60 degrees+/−0.25 degrees. The distance B between each parallelogram is 1.11 to 1.13 inches or 2.82 to 2.87 cm. The distance between the front 130 and the back 125 is between 0.315 and 0.335 inches or 0.80 cm and 0.85 cm and the thickness of the honeycomb seal 45 is between 0.195 and 0.205 inches or between 0.49 and 0.52 cm. The ratio between the angle α and the distance B is therefore α/B or 54.3-52.9:1 in degrees per centimeter.

Figure 6:
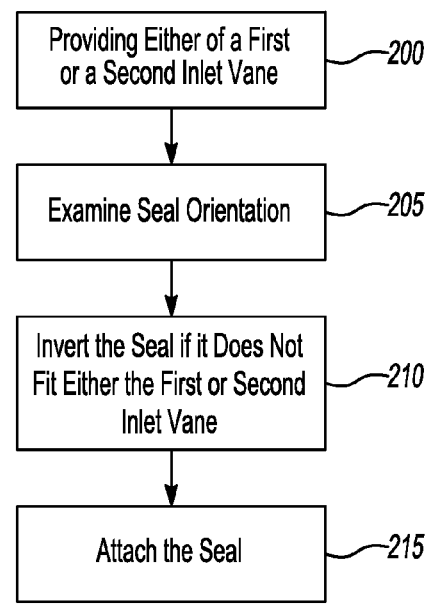
FIG. 6 is a block diagram of a method of using the seal of FIG. 1

Referring now to FIG. 6, a user is provided with either of an inlet vane 55 imparting a first twist (e.g., counterclockwise) of air passing thereby or a second inlet vane 65 imparting a second, different twist (e.g., clockwise) of air passing thereby (step 200). The user then examines the orientation of the seal 45 (step 205) and then inverts the seal to fit either of the inlet vane 55 or the inlet vane 65 if the seal does not fit the inlet vane 55 or the inlet vane 65 after first examining the seal (step 210). The user then attaches the seal to the provided inlet vane 55 or 65.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments. For instance, while a seal 45 with a honeycomb is shown herein, other seals are contemplated for use herewith if the seal is two-sided and approximates the shape of the attachment area 75.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine having a seal, said gas turbine engine comprising:
 a first vane for imparting a first twist to air passing thereby and/or a second vane for imparting a second, different twist to air passing thereby, said first vane having a first mounting area and second vane having a second mounting area for mounting said seal thereto, said seal comprising:
 a top,
 a bottom,
 a left side,
 a right side,
 a back, and
 a front,
 wherein said back is parallel to said front and said left side is parallel to said right side such that a non-square shape is formed by the intersection of the back, the left side, the front and the right side, said seal is configured to mate with said first mounting area of said first vane when in a first orientation and mate with said second mounting area of said second vane when in a second orientation inverted relative to the first orientation.

2. The engine of claim 1 further comprising a first chamfer defined between said top and said front such that said seal does not contact an impediment in said mounting area of said first vane.

3. The engine of claim 2 further comprising a second chamfer defined between said front and said bottom such that said seal does not contact an impediment in said mounting area of said second vane.

4. The engine of claim 1 further comprising a second chamfer defined between said front and said bottom such that said seal does not contact an impediment in said mounting area of said second vane.

5. The engine of claim 4 wherein said impediment is a radius area in said mounting area.

6. The engine of claim 1 further comprising a sealing surface upon said top and said bottom of said seal.

7. The engine of claim 1 wherein said mounting area of said first vane is shaped like a first parallelogram.

8. The engine of claim 7 wherein said seal mates flush with said first parallelogram.

9. The engine of claim 7 wherein said mounting area of said second vane is shaped like a second parallelogram wherein said first parallelogram is an inverse of said second parallelogram.

10. The engine of claim 9 wherein said seal is inverted to mate with said shape of said second parallelogram.

11. The seal of claim 7 wherein said first parallelogram has an angle to distance ratio of adjoining sides of between 54.3-52.9:1 in degrees per centimeter.

12. A method for mounting a seal in a gas turbine engine, said method comprising:
 providing either a first vane imparting a first twist of air passing thereby or a second vane imparting a second, different twist of air passing thereby, selecting one of said first vane or said second vane,
examining said seal, and
inverting said seal to fit said first or second vane if said seal does not fit said first or second vane after examining said seal.

13. The method of claim 12 further comprising:
brazing said seal to a first mounting area or a second mounting area.

\* \* \* \* \*